(12) United States Patent
Obana

(10) Patent No.: US 11,507,637 B2
(45) Date of Patent: Nov. 22, 2022

(54) INFORMATION PROCESSING APPARATUS, INFORMATION PROCESSING METHOD, AND PROGRAM FOR LINKING ACCOUNTS

(71) Applicant: Gurunavi, Inc., Chiyoda-ku (JP)

(72) Inventor: Koji Obana, Chiyoda-ku (JP)

(73) Assignee: Gurunavi, Inc., Chiyoda-ku (JP)

( * ) Notice: Subject to any disclaimer, the term of this patent is extended or adjusted under 35 U.S.C. 154(b) by 0 days.

(21) Appl. No.: 16/755,256

(22) PCT Filed: Oct. 4, 2019

(86) PCT No.: PCT/JP2019/039343
§ 371 (c)(1),
(2) Date: Apr. 10, 2020

(87) PCT Pub. No.: WO2021/005808
PCT Pub. Date: Jan. 14, 2021

(65) Prior Publication Data
US 2021/0173890 A1 Jun. 10, 2021

(30) Foreign Application Priority Data

Jul. 11, 2019 (JP) .............................. JP2019-129073

(51) Int. Cl.
*G06F 16/957* (2019.01)
*G06F 16/958* (2019.01)
(Continued)

(52) U.S. Cl.
CPC ........ *G06F 16/9577* (2019.01); *G06F 16/958* (2019.01); *H04L 67/02* (2013.01); *H04L 67/306* (2013.01)

(58) Field of Classification Search
CPC . G06F 16/9577; G06F 16/958; H04L 67/306; H04L 67/02
See application file for complete search history.

(56) References Cited

U.S. PATENT DOCUMENTS

| | | | |
|---|---|---|---|
| 7,089,310 B1 * | 8/2006 | Ellerman | H04M 7/0024 709/227 |
| 7,757,080 B1 * | 7/2010 | Schilder | H04L 67/02 713/162 |

(Continued)

FOREIGN PATENT DOCUMENTS

| | | |
|---|---|---|
| CN | 104077713 A | 10/2014 |
| CN | 106021269 A | 10/2016 |

(Continued)

OTHER PUBLICATIONS

Combined Taiwanese Office Action and Search Report dated Dec. 2, 2020 in Patent Application No. 109108167 (with English language translation), 54 pages.

(Continued)

*Primary Examiner* — Michael Won
(74) *Attorney, Agent, or Firm* — Oblon, McClelland, Maier & Neustadt, L.L.P.

(57) ABSTRACT

To optimize content of a webpage in a manner that depends on whether or not a user has linked accounts to each other. The solving means is an information processing apparatus including a storage unit, a communication unit, and a control unit. The storage unit stores information regarding a first account of each of a plurality of users and first content and second content to be placed on a webpage. The communication unit communicates with a user terminal of the user. The control unit sends a webpage on which the first content is placed to the user terminal in a case where the control unit receives a display request of the webpage from the user terminal and where the display request includes information indicating that a second account of the user has been linked to the first account and sends a webpage on which the second content is placed to the user terminal in a case where the control unit receives the display request of the webpage from the user terminal and where the display request (Continued)

includes information indicating that the second account has not been linked to the first account or does not include the information indicating that the second account of the user has been linked to the first account.

15 Claims, 4 Drawing Sheets

(51) Int. Cl.
    *H04L 67/02*     (2022.01)
    *H04L 67/306*    (2022.01)

(56) References Cited

U.S. PATENT DOCUMENTS

| | | | | |
|---|---|---|---|---|
| 8,875,243 | B1* | 10/2014 | Cherukumudi | H04L 63/102 726/4 |
| 9,064,269 | B1* | 6/2015 | Lei | G06F 11/3466 |
| 9,736,246 | B1* | 8/2017 | Armstrong | H04L 63/10 |
| 10,410,257 | B1* | 9/2019 | Choi | G06Q 30/0276 |
| 2003/0131045 | A1* | 7/2003 | McGee | G06F 16/957 709/201 |
| 2006/0075019 | A1* | 4/2006 | Donovan | H04L 67/306 709/203 |
| 2009/0271493 | A1* | 10/2009 | Boucard | G06Q 30/02 709/213 |
| 2009/0293108 | A1* | 11/2009 | Weeden | G06F 21/41 726/6 |
| 2011/0154130 | A1* | 6/2011 | Helander | H04L 65/1069 714/48 |
| 2012/0136704 | A1* | 5/2012 | Carlson | G06Q 20/10 705/14.17 |
| 2013/0254308 | A1* | 9/2013 | Rose | H04N 21/252 709/206 |
| 2013/0262673 | A1 | 10/2013 | Hall et al. | |
| 2014/0067949 | A1* | 3/2014 | Dearlove | H04L 67/306 709/204 |
| 2014/0101577 | A1* | 4/2014 | Kwak | G06F 3/1431 715/761 |
| 2014/0122294 | A1 | 5/2014 | Chen et al. | |
| 2015/0012987 | A1* | 1/2015 | Tian | H04L 67/02 726/6 |
| 2016/0173615 | A1* | 6/2016 | Pattan | H04L 63/102 709/225 |
| 2016/0283951 | A1 | 9/2016 | Boss et al. | |
| 2016/0366119 | A1* | 12/2016 | Rykowski | H04L 63/0815 |
| 2017/0039353 | A1* | 2/2017 | James | H04L 63/105 |
| 2019/0372962 | A1* | 12/2019 | Maria | H04L 63/108 |
| 2020/0074009 | A1* | 3/2020 | Marzorati | H04L 67/02 |
| 2021/0084024 | A1* | 3/2021 | Sadayoshi | H04L 63/0815 |

FOREIGN PATENT DOCUMENTS

| | | |
|---|---|---|
| JP | 6377293 B1 | 8/2018 |
| KR | 10-2015-0022078 A | 3/2015 |
| TW | 201416894 A | 5/2014 |

OTHER PUBLICATIONS

Korean Office Action dated Apr. 28, 2021 in Korean Patent Application No. 10-2020-7006272 (with English translation), 13 pages.

Office Action dated Feb. 24, 2021 in corresponding Patent Application No. 2019326787, 9 pages.

\* cited by examiner

A

B

INFORMATION PROCESSING APPARATUS, INFORMATION PROCESSING METHOD, AND PROGRAM FOR LINKING ACCOUNTS

TECHNICAL FIELD

The present invention relates to an information processing apparatus, an information processing method, and a program that execute information processing for presenting content to a user of a user terminal.

BACKGROUND ART

From the past, there is known a system that links accounts between services that use user identification systems (accounts, IDs) different from each other. For example, Patent Literature 1 below has disclosed a configuration in which a first URL including a presenter identifier is generated and a second URL including a user identifier is generated, such that the presenter identifier and the user identifier are acquired in association with each other in a case where access to an information acquisition server has been done with the first URL and the second URL.

CITATION LIST

Patent Literature

Patent Literature 1: Japanese Patent No. 6377293

DISCLOSURE OF INVENTION

Technical Problem

However, in the past, when a webpage is provided to a user, the same content is provided irrespective of whether or not the user has linked the accounts.

In view of the above-mentioned circumstances, it is an object of the present invention to provide an information processing apparatus, an information processing method, and a program that are capable of optimizing content of a webpage in a manner that depends on whether or not the user has linked accounts to each other.

Solution to Problem

In order to accomplish the above-mentioned object, an information processing apparatus according to an embodiment of the present invention includes a storage unit, a communication unit, and a control unit. The storage unit stores information regarding a first account of each of a plurality of users and first content and second content to be placed on a webpage. The communication unit communicates with a user terminal of the user. The control unit sends a webpage on which the first content is placed to the user terminal in a case where the control unit receives a display request of the webpage from the user terminal and where the display request includes information indicating that a second account of the user has been linked to the first account and sends a webpage on which the second content is placed to the user terminal in a case where the control unit receives the display request of the webpage from the user terminal and where the display request includes information indicating that the second account has not been linked to the first account or does not include the information indicating that the second account of the user has been linked to the first account.

With this configuration, the information processing apparatus is capable of optimizing content of a webpage in a manner that depends on whether or not a user has linked accounts to each other. The content set forth herein is typically an icon, a button, or the like to which web ad images and various hyperlinks are set, for example, though not limited thereto. Any types of content such as text, a still image, and a moving image can be employed.

The control unit may send the webpage on which the second content is placed in a case where the user terminal has not logged in with any account when the control unit receives the display request.

With this configuration, the information processing apparatus is capable of causing the user terminal to immediately display the webpage even under a state in which the user has not logged in and whether or not the accounts have been linked to each other is unknown.

The control unit may place information on the webpage as the second content in the case where the display request includes information indicating that the second account has not been linked to the first account or does not include the information indicating that the second account of the user has been linked to the first account, the information prompting to do the linking.

With this configuration, the information processing apparatus is capable of guiding a user who has not done linking to the second account to the linking.

The storage unit may store information indicating a service usage history with the second account of the user. In this case, the control unit may place the information that prompts to do the linking on the webpage in a case where the usage history of the user exists.

With this configuration, the information processing apparatus is capable of proposing linking to a user who has not done linking to the second account and can enjoy effects provided by the linking with a high possibility.

The second account may include a plurality of second accounts and the storage unit may store information indicating whether or not the usage history exists with respect to the plurality of second accounts. In this case, the control unit may place information that prompts to link to a second account, whose frequency of usage is highest among the plurality of second accounts, on the webpage.

With this configuration, the information processing apparatus is capable of proposing, to the user, linking to an account with which the user can enjoy effects provided by the linking with a highest possibility among the plurality of second accounts.

The control unit may place each of the first content and the second content at a same position on the webpage in accordance with a determination result of the linking.

With this configuration, the information processing apparatus is capable of enabling the user to readily know a change in display contents of the webpage in a manner that depends on whether or not the linking has been done.

The control unit may place same content in a region on the webpage, the region excluding the position at which the first content or the second content is placed.

With this configuration, the information processing apparatus is capable of enabling the user to know a change in display contents of the webpage in a manner that depends on whether or not the linking has been done at a glance.

An information processing apparatus according to another embodiment of the present invention includes a storage unit, a communication unit, and a control unit. The storage unit stores information regarding a first account of each of a plurality of users and linking information indicating whether or not a second account of the user has been linked to the first account and first content and second content to be placed on a webpage. The communication unit communicates with a user terminal of the user. The control unit determines, in a case where the control unit receives a display request of the webpage from the user terminal, whether or not the first account of the user has been linked to the second account on the basis of the linking information, and sends a webpage on which the first content is placed to the user terminal in a case where the control unit determines that the first account of the user has been linked to the second account and sends a webpage on which the second content is placed to the user terminal in a case where the control unit determines that the first account of the user has not been linked to the second account.

An information processing apparatus according to another embodiment of the present invention includes a communication unit and a control unit. The communication unit communicates with a user terminal of each of a plurality of users. The control unit generates, in a case where the control unit receives a linking request to link a second account of the user to a first account of the user, information indicating that the first account has been linked to the second account as a cookie and sends the cookie to the user terminal for storing the cookie.

With this configuration, in a case where the user terminal next accesses the information processing apparatus, the information processing apparatus is capable of determining whether or not the first account has been linked to the second account on the basis of the cookie.

An information processing apparatus according to another embodiment of the present invention includes a storage unit, a communication unit, and a control unit. The storage unit stores linking information indicating whether or not a second account of each of a plurality of users has been linked to a first account of the user. The communication unit communicates with a user terminal of the user. The control unit determines, in a case where the control unit receives a request to log-in with the first account from the user terminal, whether or not the second account has been linked to the first account on the basis of the linking information, and generates, in a case where the control unit determines that the second account has been linked to the first account, information indicating that the first account has been linked to the second account as a cookie and sends the cookie to the user terminal for storing the cookie.

An information processing apparatus according to another embodiment of the present invention includes a storage unit, a communication unit, and a control unit. The storage unit stores linking information indicating whether or not a second account of a user has been linked to a first account of the user. The communication unit sends a display request of a webpage to a server. The control unit receives the webpage and first content and second content, the webpage and the first content and second content being sent from the server in response to the display request, determines whether or not the second account has been linked to the first account on the basis of the linking information, and places the first content on the webpage and outputs the webpage in a case where the control unit determines that the second account has been linked to the first account and places the second content on the webpage and outputs the webpage in a case where the control unit determines that the second account has not been linked to the first account.

An information processing method according to another embodiment of the present invention includes:

storing information regarding a first account of each of a plurality of users and first content and second content to be placed on a webpage; and sending a webpage on which the first content is placed to the user terminal in a case where a display request of the webpage is received from a user terminal of the user and where the display request includes information indicating that a second account of the user has been linked to the first account and sending a webpage on which the second content is placed to the user terminal in a case where the display request of the webpage is received from the user terminal of the user and where the display request includes information indicating that the second account has not been linked to the first account or does not include the information indicating that the second account of the user has been linked to the first account.

An information processing method according to another embodiment of the present invention includes:

storing information regarding a first account of each of a plurality of users and linking information indicating whether or not a second account of the user has been linked to the first account;

determining, in a case where a display request of the webpage is received from a user terminal of the user, whether or not the first account of the user has been linked to the second account on the basis of the linking information;

sending a webpage on which the first content is placed to the user terminal in a case where it is determined that the first account of the user has been linked to the second account; and sending a webpage on which the second content is placed to the user terminal in a case where it is determined that the first account of the user has not been linked to the second account.

An information processing method according to another embodiment of the present invention includes:

generating, in a case where a linking request to link a second account of a user to a first account of the user is received, information indicating that the first account has been linked to the second account as a cookie; and sending the cookie to a user terminal of the user for storing the cookie.

An information processing method according to another embodiment of the present invention includes:

storing linking information indicating whether or not a second account of each of a plurality of users has been linked to a first account of the user;

determining, in a case where a request to log-in with the first account is received from a user terminal of the user, whether or not the second account has been linked to the first account on the basis of the linking information; and generating, in a case where it is determined that the second account has been linked to the first account, information indicating that the first account has been linked to the second account as a cookie and sending the cookie to the user terminal for storing the cookie.

An information processing method according to another embodiment of the present invention includes:

storing linking information indicating whether or not a second account of a user has been linked to a first account of the user;

sending a display request of a webpage to a server;

receiving the webpage and first content and second content, the webpage and the first content and second content being sent from the server in response to the display request;

determining whether or not the second account has been linked to the first account on the basis of the linking information;

placing the first content on the webpage and outputting the webpage in a case where it is determined that the second account has been linked to the first account; and placing the second content on the webpage and outputting the webpage in a case where it is determined that the second account has not been linked to the first account.

A program according to another embodiment of the present invention that causes an information processing apparatus to execute:

a step of storing information regarding a first account of each of a plurality of users and first content and second content to be placed on a webpage; and a step of sending a webpage on which the first content is placed to the user terminal in a case where a display request of the webpage is received from a user terminal of the user and where the display request includes information indicating that a second account of the user has been linked to the first account and sending a webpage on which the second content is placed to the user terminal in a case where the display request of the webpage is received from the user terminal of the user and where the display request includes information indicating that the second account has not been linked to the first account or does not include the information indicating that the second account of the user has been linked to the first account.

A program according to another embodiment of the present invention that causes an information processing apparatus to execute:

a step of storing information regarding a first account of each of a plurality of users and linking information indicating whether or not a second account of the user has been linked to the first account;

a step of determining, in a case where a display request of the webpage is received from a user terminal of the user, whether or not the first account of the user has been linked to the second account on the basis of the linking information;

a step of sending a webpage on which the first content is placed to the user terminal in a case where it is determined that the first account of the user has been linked to the second account; and a step of sending a webpage on which the second content is placed to the user terminal in a case where it is determined that the first account of the user has not been linked to the second account.

A program according to another embodiment of the present invention that causes an information processing apparatus to execute:

a step of storing linking information indicating whether or not a second account of each of a plurality of users has been linked to a first account of the user;

a step of determining, in a case where a request to log-in with the first account is received from a user terminal of the user, whether or not the second account has been linked to the first account on the basis of the linking information; and a step of generating, in a case where it is determined that the second account has been linked to the first account, information indicating that the first account has been linked to the second account as a cookie and sending the cookie to the user terminal for storing the cookie.

A program according to another embodiment of the present invention that causes an information processing apparatus to execute:

a step of storing linking information indicating whether or not a second account of a user has been linked to a first account of the user;

a step of sending a display request of a webpage to a server;

a step of receiving the webpage and first content and second content, the webpage and the first content and second content being sent from the server in response to the display request;

a step of determining whether or not the second account has been linked to the first account on the basis of the linking information;

a step of placing the first content on the webpage and outputting the webpage in a case where it is determined that the second account has been linked to the first account; and a step of placing the second content on the webpage and outputting the webpage in a case where it is determined that the second account has not been linked to the first account.

Advantageous Effects of Invention

As described above, in accordance with the present invention, it is possible to optimize content of a webpage in a manner that depends on whether or not a user has linked accounts to each other. It should be noted that the effects do not limit the present invention.

BRIEF DESCRIPTION OF DRAWINGS

A diagram showing a configuration of a restaurant information providing system according to an embodiment of the present invention.

A diagram showing a hardware configuration of a restaurant information providing server according to the embodiment of the present invention.

A diagram showing a configuration of databases of the restaurant information providing server according to the embodiment of the present invention.

A flowchart showing a flow of webpage content optimization processing by the restaurant information providing server according to the embodiment of the present invention.

A diagram showing webpage examples displayed on a user terminal, which are generated by the restaurant information providing server according to the embodiment of the present invention.

MODE(S) FOR CARRYING OUT THE INVENTION

Hereinafter, an embodiment of the present invention will be described with reference to the drawings.

System Configuration

Figure 1:
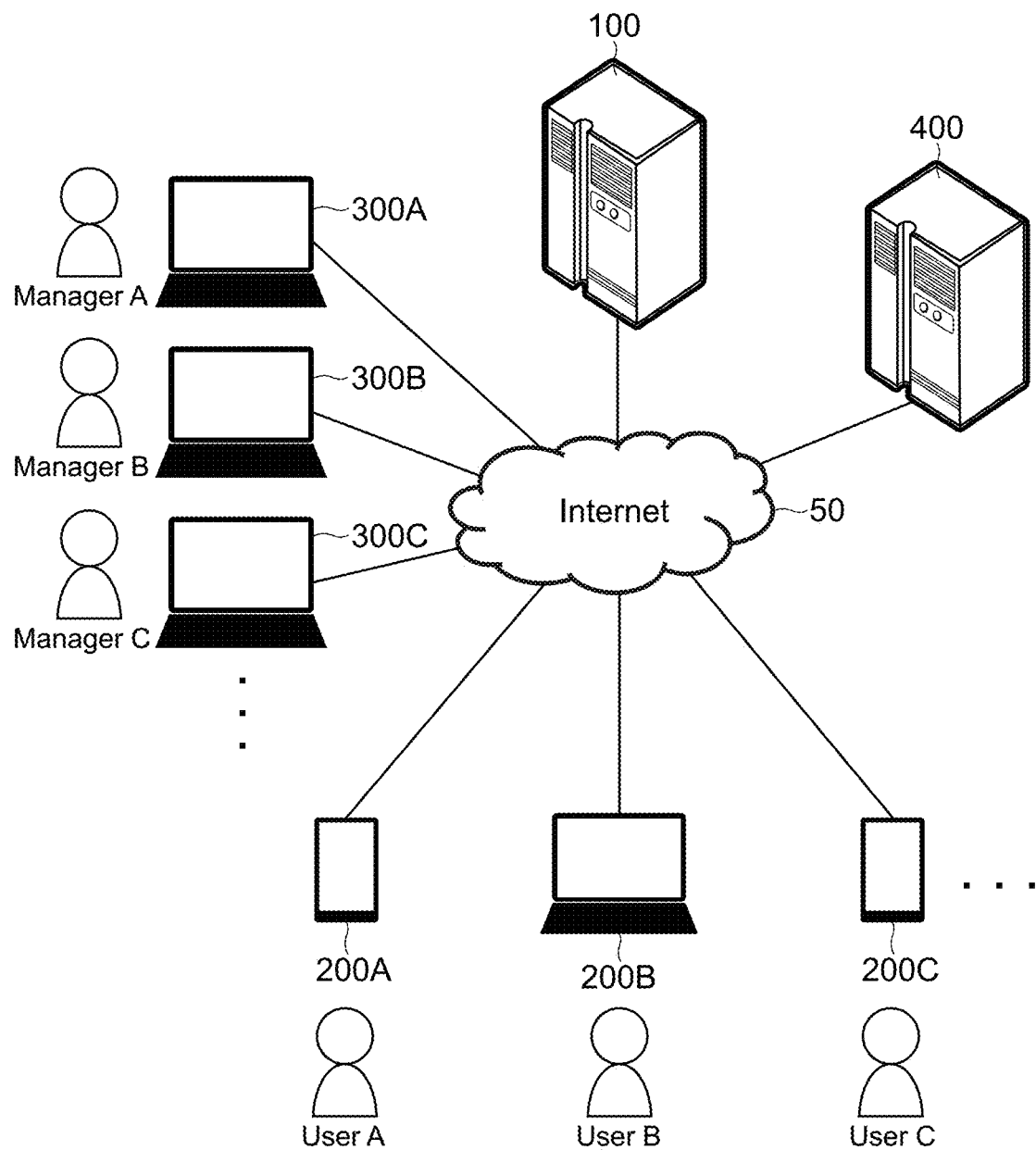

FIG. 1 is a diagram showing a configuration of a restaurant information providing system according to this embodiment.

As shown in the figure, this system includes a restaurant information providing server 100 on the Internet 50, a plurality of user terminals 200, a plurality of restaurant terminals 300, and another e-commerce (EC) server 400.

The restaurant information providing server 100 is a webserver that operates a portal site on which restaurant-related information is placed. The restaurant information providing server 100 is connected to the plurality of user terminals 200 and the restaurant terminals 300 of a plurality of restaurants via the Internet 50.

The restaurant information providing server 100 provides a search system of the restaurant information for users of the user terminals 200 on the portal site. Specifically, the restaurant information providing server 100 searches for restaurant information that matches a search condition on the basis of a search request from one of the user terminals 200. Then, the restaurant information providing server 100 generates a webpage on which search results are placed and sends it to the user terminal 200. Further, the restaurant information providing server 100 performs reservation reception processing on any restaurant from the user terminal 200 of the user who has viewed the restaurant information, in place of the user.

The user terminal 200 (200A, 200B, 200C . . . ) is a terminal used by a user. The user terminal 200 (200A, 200B, 200C . . . ) is a smartphone, a portable phone, a tablet personal computer (PC), a laptop PC, a desktop PC, or the like, for example. The user terminal 200 accesses the restaurant information providing server 100, receives the webpage, and displays it on the screen through a browser or the like.

The user terminal 200 determines a restaurant search condition on the basis of a user's operation and sends a restaurant search request based on the search condition to the restaurant information providing server 100. In this embodiment, the user of the user terminal 200 can send the search request by selecting a pre-set search condition such as a restaurant location (nearest station), a genre, prices, and the like. Then, based on a user's operation, the user terminal 200 is capable of sending a reservation request of any restaurant displayed as the search result to the restaurant information providing server 100.

In order for the user to use various services such as restaurant reservation via the portal site, the user needs to have an account (ID) as a member of the service provided by the restaurant information providing server 100 and log in the portal site with the account. In a case where the user uses a predetermined service with the account, points depending on the contents of the service are given to (the account of) the user.

Moreover, on the other hand, the restaurant information providing server 100 provides a management screen (webpage) of the restaurant information for restaurants (member restaurants) to be placed on the portal site. Via the management screen, a user of the restaurant terminal 300 can edit and update the restaurant information on the webpage, which is provided to ordinary users as the search result, and upload that webpage to the portal site.

The restaurant terminal 300 (300A, 300B, 300C . . . ) is a terminal installed in each restaurant. The restaurant terminal 300 (300A, 300B, 300C . . . ) is a tablet PC, a laptop PC, a desktop PC, or the like. The restaurant terminal 300 is capable of executing processing on its own restaurant information in communication with the restaurant information providing server 100 on the basis of a manager's operation. The processing on its own restaurant information includes editing and updating the restaurant information.

Moreover, the other EC server 400 provides an EC service for members like the restaurant information providing server 100. For using the service provided by the EC server 400, the user of the user terminal 200 needs to have an account as a member and log in the portal site with the account. Also in a case where the user uses a predetermined service with that account, points depending on the contents of the service are given to (the account of) the user.

In this embodiment, the user of the user terminal 200 is capable of linking an account (hereinafter, a first account) for using a restaurant information providing service offered by the restaurant information providing server 100 to an account (hereinafter, a second account) for using an EC service offered by the other EC server 400 through a predetermined linking request procedure.

Then, in a case where the user who has logged in with the first account has accessed a predetermined webpage of the restaurant information providing server 100, the restaurant information providing server 100 is capable of optimizing (appropriately providing) the content of the webpage in a manner that depends on whether or not the first account has been linked to the second account. The optimization processing of the content of the webpage will be described later in detail.

Hardware Configuration of Restaurant Information Providing Server

Figure 2:
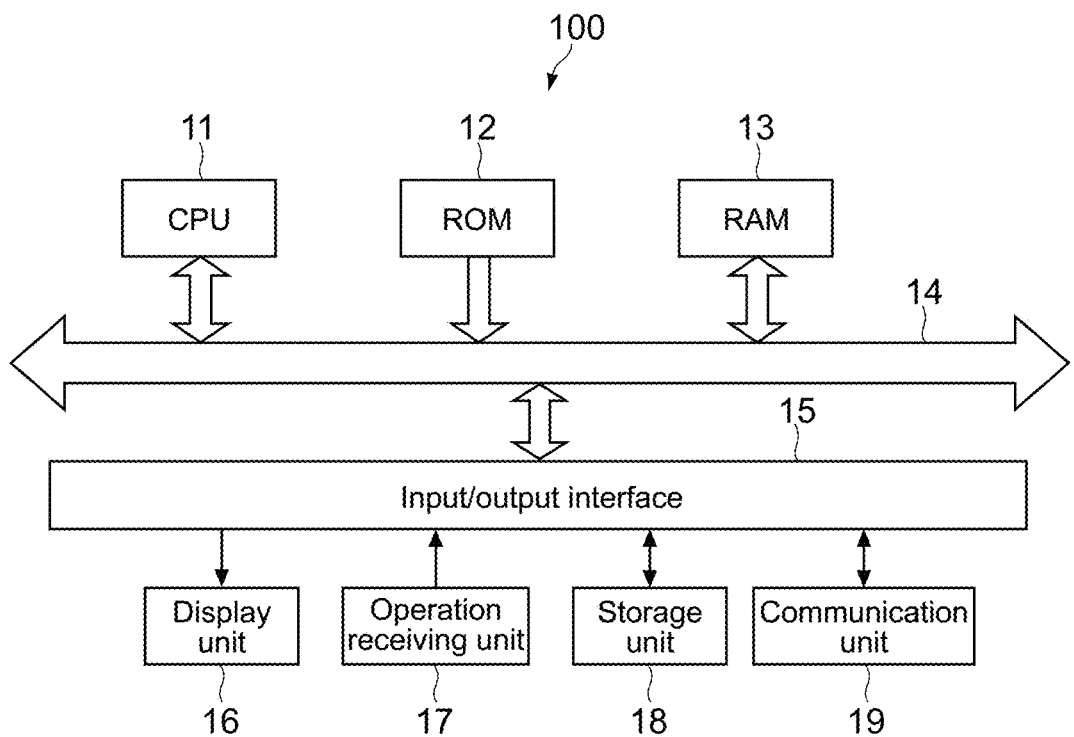

FIG. 2 is a diagram showing a hardware configuration of the restaurant information providing server 100. As shown in the figure, the restaurant information providing server 100 includes a central processing unit (CPU) 11, a read only memory (ROM) 12, a random access memory (RAM) 13, an input/output interface 15, and a bus 14 that connects them to one another.

The CPU 11 accesses the RAM 13 or the like as appropriate in a manner that depends on needs. Then, the CPU 11 comprehensively controls all the respective blocks of the restaurant information providing server 100 while performing various types of arithmetic processing. The ROM 12 is a nonvolatile memory in which an OS, firmware such as programs and various parameters to be executed by the CPU 11 are fixedly stored. The RAM 13 is used as a working area of the CPU 11 or the like and temporarily retains the OS, the running various applications, and various types of data being processed.

A display unit 16, an operation receiving unit 17, a storage unit 18, a communication unit 19, and the like are connected to the input/output interface 15.

The display unit 16 is a display device using a liquid crystal display (LCD), an organic electroluminescence display (OELD), a cathode ray tube (CRT), or the like, for example.

The operation receiving unit 17 is a pointing device such as a mouse, a keyboard, a touch panel, and another input device, for example. In a case where the operation receiving unit 17 is a touch panel, the touch panel can be integral with the display unit 16.

The storage unit 18 is a nonvolatile memory such as a hard disk drive (HDD), a flash memory (solid state drive (SSD)), and another solid-state memory, for example. The above-mentioned OS, various applications, and various types of data are stored in the storage unit 18.

As will be described later, especially in this embodiment, the storage unit 18 includes the restaurant information database, the user information database, and the content information database other than programs of applications and the like necessary for webpage content optimization processing.

The communication unit 19 is a network interface card (NIC) for Ethernet or various modules for wireless communication such as wireless LAN, for example. The communication unit 19 serves to perform processing of communication with the user terminals 200.

It should be noted that, although not shown in the figure, the basic hardware configurations of the user terminals 200, the restaurant terminals 300, and the other EC server 400 are approximately similar to the hardware configuration of the restaurant information providing server 100.

Database Configuration of Restaurant Information Providing Server

Figure 3:
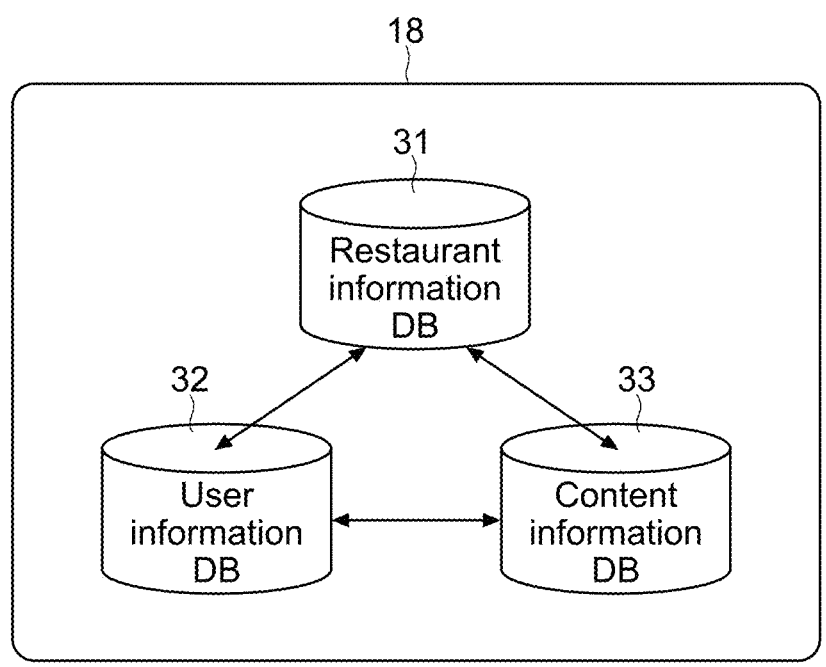

FIG. 3 is a diagram showing a configuration of databases of the restaurant information providing server 100.

As shown in the figure, the restaurant information providing server 100 includes a restaurant information database 31, a user information database 32, and a content information database 33 in the storage unit 18.

The restaurant information database 31 stores, for each restaurant, the name of that restaurant, a location (address or latitude/longitude) information, area information, access information (nearest-station information, information regarding a time by walk from nearest station), a telephone number, an ID for identifying that restaurant (restaurant ID), category information of the type of operation and service of that restaurant, information for presenting that restaurant (information indicating features of the restaurant such as PR text of the restaurant, information regarding an event presented by the restaurant, and the like), image data related to the restaurant (presenting the restaurant), menu information related to menus offered by the restaurant, average budget information, information regarding business hours, a website URL, and the like, and the like. Such information is input through the restaurant terminal 300 of each restaurant via the management screen provided by the restaurant information providing server 100. Further, the restaurant information database 31 may store information (reservation list information) indicating reservation reception states in each restaurant.

The menu information is information corresponding to a menu to be placed on each restaurant site of the portal site. In the menu information, the menu names of a plurality of menus that each restaurant can offer are stored for each restaurant. The menu information may be stored for each menu category such as appetizer/main and lunch/dinner/course, for example. Further, besides as well as text information indicating the menu name, prices, descriptions, and the like, image information of photographs of the menu or the like is also stored as the menu information in association with them.

The area information includes information regarding a plurality of areas different in unit of area. Examples of a wide area can include prefectures and municipalities, examples of a narrow area can include an area within several hundreds of meters from the station (e.g., "Ginza area"), and examples of an intermediate wide area can include an area within an area within 1 km from the station and an area group of a plurality of areas near the station (e.g., "Ginza, Shinbashi, and Yurakucho area"), though not limited thereto. That is, even the same restaurant is associated with a plurality of areas in a manner that depends on its unit of area.

The category information includes, for example, a main category such as Japanese cuisine, Chinese cuisine, Italian cuisine, French cuisine, and Yakiniku (BBQ) and may further include a more specific sub-category such as Yakitori (grilled meat and vegetables skewers), Tempura (deep fried shrimp and vegetables), and the like in Japanese cuisine and pasta, pizza, and the like in Italian cuisine.

The user information database 32 stores information regarding a user who possesses the user terminal 200 and is a user (member) of a restaurant information service via the portal site provided by the restaurant information providing server 100. Specifically, the user information database 32 stores, for each user, information regarding a user ID (first account), a password, the name, a mail address (information that can be another message destination), a telephone number, an address, age (group), sex, the date of birth, and the like.

Moreover, in a case where the second account linked to the first account exists, the user information database 32 also stores information regarding the second account in association with first account information. That information is stored in a case where a request to link to the second account is sent to the restaurant information providing server 100 from the user terminal 200. Otherwise, in a case where a request to link the first account is sent from the user terminal 200 to the other EC server 400 that manages the second account which is a linking destination, such information may be received and stored from the other EC server 400.

In addition, the user information database 32 also stores information regarding points given to the user. As information regarding those points, information regarding points given to the first account is stored in a case where no accounts linked to the first account exist. Otherwise, in a case where the second account linked to the first account exists, information regarding points given to the second account as well as the points given to the first account are stored.

The content information database 33 stores various types of content information to be placed on a webpage to be displayed on the user terminal 200. That content is selected in a manner that depends on whether or not the user of the user terminal 200 has linked the second account to the first account. Based on it, the webpage to be displayed on the user terminal 200 is generated.

The content is typically an icon, a button, or the like to which web ad images and various hyperlinks are set, for example, though not limited thereto. Any types of content such as text, a still image, and a moving image can be employed.

Each of those databases is used by cross referencing in webpage content optimization processing to be described later by the restaurant information providing server 100 in a manner that depends on needs.

Operation of Restaurant Information Providing Server

Next, an operation of the restaurant information providing server 100 configured in the above-mentioned manner will be described. The operation is executed by cooperation of the hardware such as the CPU 11 of the restaurant information providing server 100 and the communication unit 19 and the software stored in the storage unit 18. In the following description, it is assumed that the CPU 11 mainly performs the operation for the sake of convenience.

Figure 4:
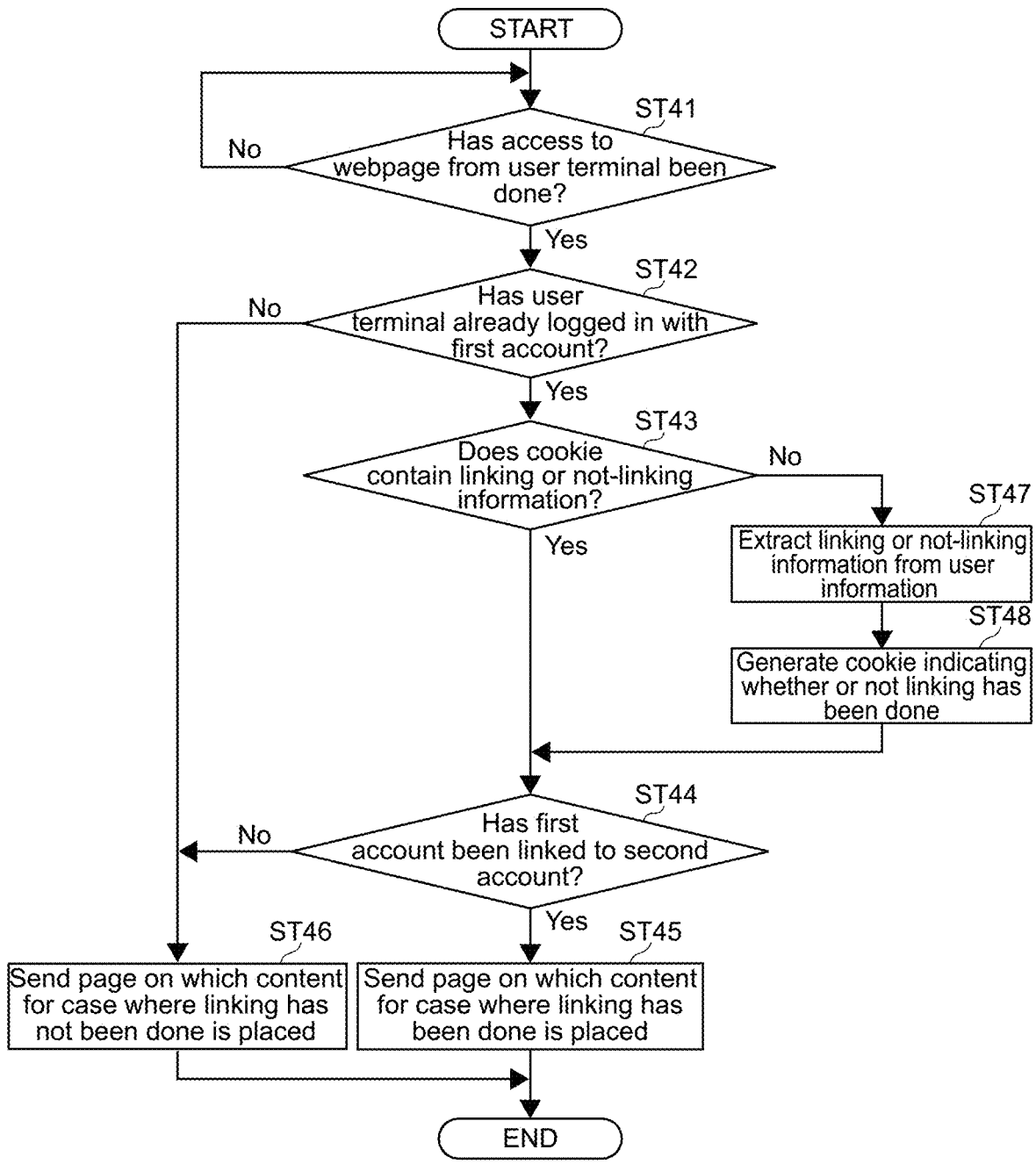

FIG. 4 is a flowchart showing a flow of webpage content optimization processing by the restaurant information providing server 100.

As shown in the figure, the CPU 11 of the restaurant information providing server 100 first determines whether or not access to a predetermined webpage from the user terminal 200 has been done on the portal site (Step 41). The access to the webpage may be done via a web search result or the like after the user of the user terminal 200 activates the browser. Alternatively, the access to the webpage may be done in such a manner that the user of the user terminal 200 activates an application corresponding to the service offered by the restaurant information providing server 100 or accesses a predetermined screen of the application.

In a case where the CPU 11 determines that the access to the webpage has been done (Yes), the CPU 11 determines whether or not the user of the user terminal 200 has already logged in with the first account (Step 42).

In a case where the CPU 11 determines that the user has logged in with the first account (Yes), the CPU 11 determines whether or not a cookie contained in a display request from the user terminal 200 includes linking or not-linking information indicating whether or not the first account has been linked to the second account (Step 43).

In a case where the CPU 11 determines that the cookie contains the linking or not-linking information (Yes), the CPU 11 determines whether or not the first account has been linked to the second account by referring to the linking or not-linking information (Step 44).

Then, in a case where the CPU 11 determines that the first account has been linked to the second account (Yes), the CPU 11 extracts content for a case where the linking has been done from the content information database 33, places it on the webpage, and sends the webpage to the user terminal 200 (Step 45).

On the other hand, in a case where the CPU 11 determines that the first account has not been linked to the second account (No), the CPU 11 extracts content for a case where the linking has not been done from the content information database 33, places the extracted content on a webpage, and sends the webpage to the user terminal 200 (Step 46).

In Step 42, in a case where the CPU 11 determines that the user has not logged in with the first account (No), the CPU 11 places the content for the case where the linking has not been done on the webpage and sends the webpage to the user terminal 200 (Step 46). Accordingly, even under a state in which the user has not logged in and whether or not the accounts have been linked to each other is unknown, the user terminal 200 can be caused to immediately display the webpage.

Further, in a case where the CPU 11 determines in Step 43 that the cookie does not contain the linking or not-linking information (No), the CPU 11 extracts the linking or not-linking information indicating whether or not the first account of the user has been linked to the second account from the user information database 32 (Step 47).

Subsequently, the CPU 11 generates the cookie indicating the linking or not-linking information (Step 48).

Subsequently, the CPU 11 determines whether or not the first account has been linked to the second account on the basis of the linking or not-linking information (Step 44).

Then, in a case where the CPU 11 determines on the basis of the determination result that both the accounts have been linked to each other (Yes), the CPU 11 sends, to the user terminal 200, a webpage on which the content for the case where the linking has been done is placed as well as the cookie indicating the linking or not-linking information (Step 45).

On the other hand, in a case where the CPU 11 determines that both the accounts have not been linked to each other (No), the CPU 11 sends, to the user terminal 200, a webpage on which the content for the case where the linking has not been done is placed as well as the cookie (Step 46).

It should be noted that in a case where the user logs in with the first account when accessing the webpage at Step 41, the CPU 11 determines whether or not the first account has been linked to the second account on the basis of the user information at the time of the log-in. Then, in a case where the CPU 11 determines that both the accounts have been linked to each other, the CPU 11 generates a cookie indicating the fact and sends, to the user terminal 200, the cookie as well as the webpage after log-in (i.e., the page on which the content for the case where the linking has been done is placed at Step 45).

Moreover, in a case where the CPU 11 determines that both the accounts have not been linked to each other, the CPU 11 generates a cookie indicating the fact and sends, to the user terminal 200, the cookie as well as the webpage after log-in (i.e., the page on which the content for the case where the linking has not been done is placed at Step 46). Alternatively, the CPU 11 does not need to generate the cookie in the case where the CPU 11 determines that both the accounts have not been linked to each other.

Figure 5:
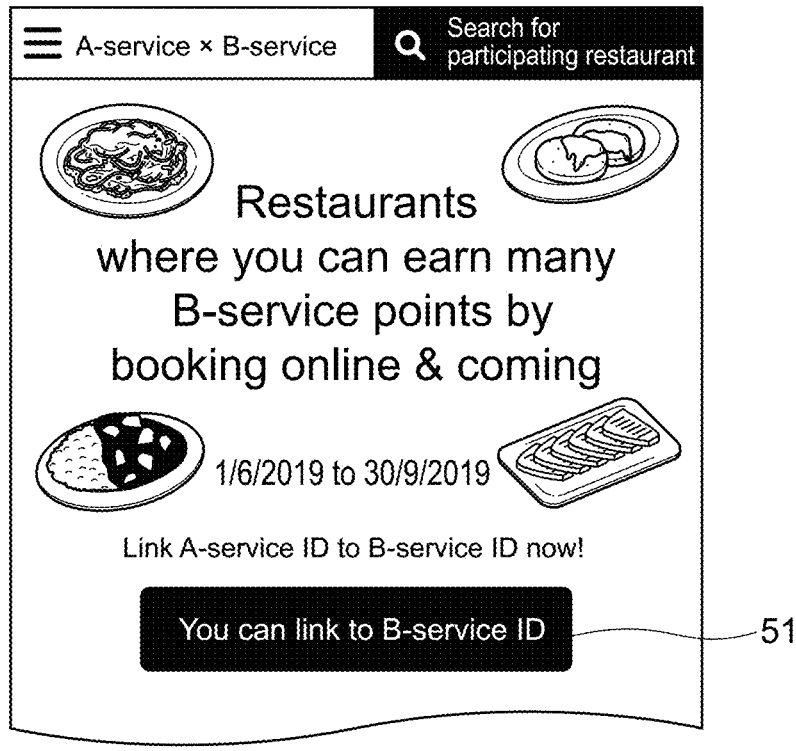
Figure 5:
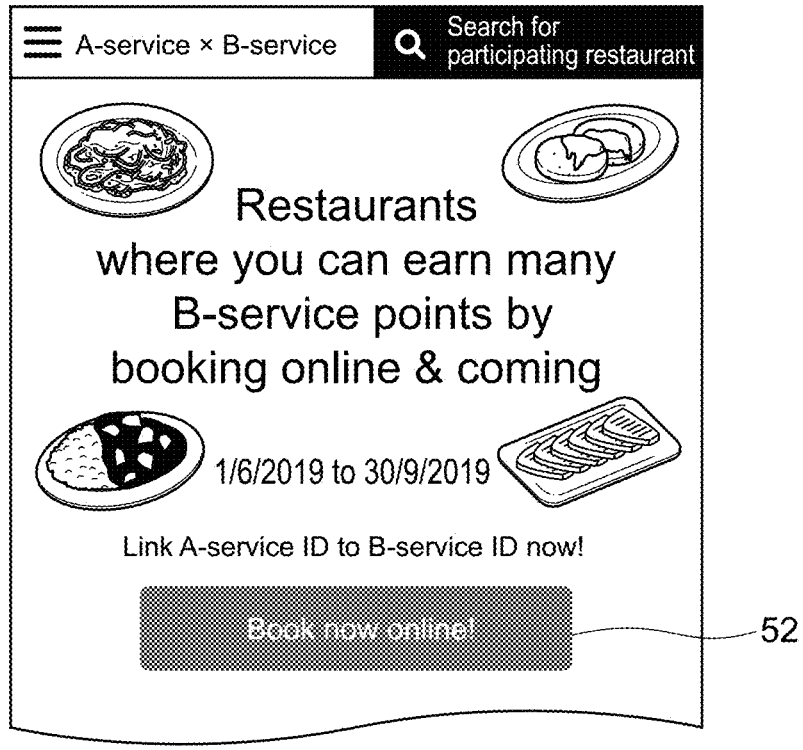

FIG. 5 is a diagram showing webpage examples to be sent to and displayed on the user terminal 200. A of the figure shows a webpage to be sent in a case where it is determined that the first account has not been linked to the second account. B of the figure shows a webpage to be sent in a case where it is determined that both the accounts have been linked to each other.

As shown in A of the figure, in a case where the restaurant information providing server 100 determines that the first account has not been linked to the second account, the restaurant information providing server 100 generates a webpage on which a linking request button 51 including text information that prompts to link to the account, for example, "You can link to . . . service ID" is placed.

A link page to make various types of inputs for linking the first account to the second account is hyperlinked to the linking request button 51. When the user of the user terminal 200 presses (taps) the linking request button 51, the link page is displayed for performing the linking task. Accordingly, the user who has the first account not linked to the second account can be guided to linking.

As shown in B of the figure, in a case where the restaurant information providing server 100 determines that the first account has been linked to the second account, the restaurant information providing server 100 may place a linking notice image 52 including text information to inform the user of the fact that the linking has been done and prompt to make a reservation at the restaurant via the Internet, for example, "Book now online!".

The linking notice image 52 is placed at the same position as the position at which the linking request button 51 is placed on the webpage shown in A of FIG. 5. Unlike the linking request button 51, the hyperlink is not set and a user's operation is inacceptable.

Further, as it will be clear by comparing both the webpages of A and B of the figure, the restaurant information providing server 100 makes the content different only in the region of the linking request button 51 or the linking notice image 52 on the webpage and places the same content in the other region. Accordingly, the user can know whether or not the accounts have been linked to each other at a glance.

In a case where a linking request to link the first account to the second account is sent to the restaurant information providing server 100 from the user terminal 200 via the linking request button 51, the restaurant information providing server 100 stores information indicating that both the accounts have been linked to each other in the user information database 32, generates the information as the cookie, and sends it to the user terminal 200, which is a source that has sent the linking request, for storing it.

Accordingly, in a case where the user terminal 200 next accesses the restaurant information providing server 100, the restaurant information providing server 100 is capable of determining whether or not the first account has been linked to the second account on the basis of that cookie.

CONCLUSION

As described above, in accordance with this embodiment, the restaurant information providing server 100 is capable of optimizing content of a webpage in a manner that depends on whether or not a user has linked accounts to each other.

Moreover, when an account linking request is sent from the user terminal 200, the restaurant information providing server 100 generates the linking or not-linking information as the cookie and saves the generated linking or not-linking information in the user terminal 200. When a next webpage display request is sent from the user terminal 200, the restaurant information providing server 100 determines whether or not the accounts have been linked to each other on the basis of the cookie. In this manner, the load of the restaurant information providing server 100 due to the traffic with the user terminal 200 can be significantly lowered as compared to a case where whether or not the linking has been done is determined each time by referring to the user information database 32.

MODIFIED EXAMPLES

The present invention is not limited to the above-mentioned embodiment and can be variously modified without departing from the gist of the present disclosure.

In the above-mentioned embodiment, the linking notice image 52 is placed on the webpage in a case where it is determined that the first account has been linked to the second account and the linking request button 51 is placed on the webpage in a case where it is determined that the first account has not been linked to the second account. However, the content placed in a manner that depends on whether or not both the accounts have been linked to each other is not limited thereto. For example, in a case where it is determined that both the accounts have been linked to each other, content that prompts to make a reservation at the restaurant with the second account, for example, a button or the like to which a hyperlink to a page of an information list of restaurants popular among users having the second account is set, may be placed.

In the above-mentioned embodiment, the restaurant information providing server 100 may store information indicating a service usage history with the second account of the user in the storage unit 18. In this case, the CPU 11 may place information that prompts to link to the second account on the webpage in a case where the CPU 11 determines that the first account has not been linked to the second account and where the CPU 11 determines that the user has a usage hi story with the second account. Accordingly, the restaurant information providing server 100 is capable of proposing linking to a user who has not done linking to the second account and can enjoy effects provided by the linking with a high possibility.

Moreover, in a case where the user has a plurality of accounts other than the first account as second accounts, the restaurant information providing server 100 may store information indicating whether or not the usage history exists with respect to the plurality of second accounts in the storage unit 18. In this case, in a case where the CPU 11 determines that the first account has not been linked to the second account, the CPU 11 may place information that prompts to link to a second account, whose frequency of usage is highest among the plurality of second accounts, on the webpage. Accordingly, the restaurant information providing server 100 is capable of proposing, to the user, linking to an account with which the user can enjoy effects provided by the linking with a highest possibility among the plurality of second accounts.

In the above-mentioned embodiment, after sending the account linking request to the restaurant information providing server 100, the user terminal 200 saves the information (linking or not-linking information) indicating whether or not the first account has been linked to the second account as the cookie. Alternatively, the user terminal 200 may store the linking or not-linking information by a means other than the cookie. In this case, the user terminal 200 sends the linking or not-linking information when accessing (sending a display request of) the webpage provided by the restaurant information providing server 100 as shown in FIG. 5. The restaurant information providing server 100 determines whether or not the accounts have been linked to each other on the basis of the linking or not-linking information contained in the display request.

In the above-mentioned embodiment, the restaurant information providing server 100 places either one of the first content and the second content on the webpage in a manner that depends on the result of determination as to whether or not the first account of the user has been linked to the second account and sends it to the user terminal 200. However, the user terminal 200, not the restaurant information providing server 100, may determine whether or not the accounts have been linked to each other and output either one of the first content and the second content on the webpage in a manner that depends on the determination result.

That is, in this case, the user terminal 200 stores linking information indicating whether or not a second account of the user has been linked to the first account of the user in the storage unit. When the user terminal 200 sends the display request of the webpage to the restaurant information providing server 100 via the communication unit, the user terminal 200 receives the webpage and the first content and the second content, which are sent in response to the display request from the restaurant information providing server 100. Further, the user terminal 200 determines whether or not the second account has been linked to the first account on the basis of the linking information. Then, the user terminal 200 places the first content on the webpage and outputs it via an output unit such as a display in a case where the user terminal 200 determines that the linking has been done. On the other hand, the user terminal 200 places the second content on the webpage and outputs the webpage in a case where the user terminal 200 determines that the linking has not been done.

Regarding inventions each recited as an "information processing method" of the inventions defined in the scope of claims of this patent application, at least one apparatus such as a computer automatically performs the respective steps through information processing based on software and a person does not perform those steps by using the apparatus such as the computer. That is, such an "information processing method" is not a method for a person to operate a calculation tool such as the computer, but an information processing method for the computer and the software.

REFERENCE SIGNS LIST

11 CPU
18 storage unit
19 communication unit
31 restaurant information database 32 user information database
33 content information database
51 linking request button
52 linking notice image
100 restaurant information providing server
200 user terminal
300 restaurant terminal
400 EC server

The invention claimed is:

1. An information processing apparatus, comprising:
a storage configured to store information regarding a first account of each of a plurality of users in a first web service and first content and second content to be displayed on a webpage of the first web service;
communication circuitry configured to communicate with a user terminal of each of the plurality of users; and
control circuitry configured to
based on a linking request to link a second account of the user of one of the user terminals in a second web service to the first account of the user in the first web service, generate linking information indicating that the first account in the first web service has been linked to the second account in the second web service as a cookie, send the cookie to the one of the user terminals, and cause the one of the user terminals to store the cookie,
based on a display request of the webpage from the one of the user terminals, determine whether or not the first account of the user of the one of the user terminals in the first web service has been linked to the second account in the second web service based on whether or not the display request includes the cookie,
send the webpage on which the first content is displayed with content of the first web service to the one of the user terminals based on the display request including the cookie, the first content indicating that the second account in the second web service is linked to the first account in the first web service, and
send the webpage on which the second content is displayed with the content of the first web service to the one of the user terminals based on the display request not including the cookie, the second content being configured to prompt the user to link the second account in the second web service,
wherein the first web service is different from the second web service.

2. The information processing apparatus according to claim 1, wherein
the control circuitry is configured to send the webpage on which the second content is displayed based on the one of the user terminals not having logged in with any account when the control circuitry receives the display request.

3. The information processing apparatus according to claim 1, wherein
the second content is associated with a linking request button to link the second account to the first account.

4. The information processing apparatus according to claim 3, wherein
the storage is configured to store information indicating a service usage history with the second account of the user, and
the control circuitry is configured to include the information that prompts the linking on the webpage based on the service usage history.

5. The information processing apparatus according to claim 4, wherein
the second account comprises a plurality of second accounts,
the storage is configured to store information indicating whether or not the service usage history exists with respect to the plurality of second accounts, and
the control circuitry is configured to include information that prompts linking of one of the second accounts, whose frequency of usage is highest among the plurality of second accounts, on the webpage.

6. The information processing apparatus according to claim 1, wherein
the control circuitry is configured to include each of the first content and the second content at a same position on the webpage in accordance with a determination result of the linking.

7. The information processing apparatus according to claim 6, wherein
the control circuitry is configured to include the same content of the first web service in a region on the webpage irrespective of which of the first content and the second content is displayed in the webpage, the region excluding the position at which the first content or the second content is included.

8. The information processing apparatus according to claim 1, wherein the linking request to link the second account of the user of one of the user terminals in the second web service to the first account of the user in the first web service is transmitted via a hyperlink request.

9. The information processing apparatus according to claim 1, wherein the linking request to link the second account of the user of one of the user terminals in the second web service to the first account of the user in the first web service further results in a database storing a linking of the first web service and the second web service.

10. The information processing apparatus according to claim 1, wherein the linking request to link the second account of the user of one of the user terminals in the second web service to the first account of the user in the first web service permits the simultaneous display of content from the first web service and content from the second web service on a same webpage, where each content is content only available to account holders of a respective first and second web services.

11. An information processing apparatus, comprising:
a storage configured to store information regarding a first account of each of a plurality of users in a first web service and linking information indicating whether or not a second account of the respective user in a second web service has been linked to the first account in the first web service and first content and second content to be displayed on a webpage;
communication circuitry configured to communicate with a user terminal of each of the plurality of users; and
control circuitry configured to
based on a linking request to link the second account of the user of one of the user terminals in the second web service to the first account of the user in the first web service, generate linking information indicating that the first account in the first web service has been linked to the second account in the second web service as a cookie, send the cookie to the one of the user terminals, and cause the one of the user terminals to store the cookie,
based on a display request of the webpage from the one of the user terminals, determine whether or not the first account of the user of the one of the user terminals in the first web service has been linked to the second account in the second web service based on whether or not the display request includes the cookie, send the webpage on which the first content is displayed with content of the first web service to the one of the user terminals based on the display request including the cookie, the first content indicating that the second account in the second web service is linked to the first account in the first web service, and send the webpage on which the second content is displayed with the content of the first web service to the one of the user terminals based on the display request not including the cookie, the second content being configured to prompt the user to link the second account in the second web service, wherein the first web service is different from the second web service.

12. An information processing method, comprising:

storing information regarding a first account of each of a plurality of users and first content in a first web service and second content to be displayed on a webpage of the first web service;

based on a linking request to link a second account of a user of the plurality of users in a second web service to the first account of the user in the first web service, generating linking information indicating that the first account in the first web service has been linked to the second account in the second web service as a cookie, sending the cookie to a user terminal of the user, and causing the user terminal to store the cookie;

based on a display request of the webpage from the user terminal, determining whether or not the first account of the user of the user terminal in the first web service has been linked to the second account in the second web service based on whether or not the display request includes the cookie;

sending the webpage on which the first content in the first web service is displayed with content of the first web service to the user terminal based on the display request including the cookie, the first content indicating that the second account in the second web service is linked to the first account in the first web service; and sending the webpage on which the second content is displayed with the content of the first web service to the user terminal based on the display request not including the cookie, the second content being configured to prompt the user to link the second account in the second web service, wherein the first web service is different from the second web service.

13. An information processing method, comprising:

storing information regarding a first account of each of a plurality of users in a first web service and linking information indicating whether or not a second account of the respective user in a second web service has been linked to the first account in the first web service and first content and second content to be displayed on a webpage;

based on a linking request to link the second account of a user of the plurality of users in the second web service to the first account of the user in the first web service, generating linking information indicating that the first account in the first web service has been linked to the second account in the second web service as a cookie, sending the cookie to a user terminal of the user, and causing the user terminal to store the cookie, determining, based on a display request of the webpage from the user terminal, whether or not the first account of the user in the first web service has been linked to the second account in the second web service based on whether or not the display request includes the cookie;

sending the webpage on which the first content is displayed with content of the first web service to the user terminal based on the display request including the cookie, the first content indicating that the second account in the second web service is linked to the first account in the first web service; and sending the webpage on which the second content is displayed with the content of the first web service to the user terminal based on the display request not including the cookie, the second content being configured to prompt the user to link the second account in the second web service, wherein the first web service is different from the second web service.

14. A non-transitory computer-readable storage medium storing a program that causes an information processing apparatus to execute an information processing method, the information processing method comprising:

storing information regarding a first account of each of a plurality of users in a first web service and first content and second content to be displayed on a webpage;

based on a linking request to link a second account of a user of the plurality of users in a second web service to the first account of the user in the first web service, generating linking information indicating that the first account in the first web service has been linked to the second account in the second web service as a cookie, sending the cookie to a user terminal of the user, and causing the user terminal to store the cookie;

based on a display request of the webpage from the user terminal, determining whether or not the first account of the user of the user terminal in the first web service has been linked to the second account in the second web service based on whether or not the display request includes the cookie;

sending the webpage on which the first content is displayed with content of the first web service to the user terminal based on the display request including the cookie, the first content indicating that the second account in the second web service is linked to the first account in the first web service; and sending the webpage on which the second content is displayed with the content of the first web service to the user terminal based on the display request not including the cookie, the second content being configured to prompt the user to link the second account in the second web service, wherein the first web service is different from the second web service.

15. A non-transitory computer-readable storage medium storing a program that causes an information processing apparatus to execute an information processing method, the information processing method comprising:

storing information regarding a first account of each of a plurality of users in a first web service and linking information indicating whether or not a second account of the respective user in a second web service has been linked to the first account in the first web service and first content and second content to be displayed on a webpage;

based on a linking request to link the second account of a user of the plurality of users in the second web service to the first account of the user in the first web service, generating linking information indicating that the first account in the first web service has been linked to the second account in the second web service as a cookie, sending the cookie to a user terminal of the user, and causing the user terminal to store the cookie, determining, based on a display request of the webpage from the user terminal, whether or not the first account of the user in the first web service has been linked to the second account in the second web service based on whether or not the display request includes the cookie;

sending the webpage on which the first content is displayed with content of the first web service to the user terminal based on the display request including the cookie, the first content indicating that the second account in the second web service is linked to the first account in the first web service; and sending the webpage on which the second content is displayed with the content of the first web service to the user terminal based on the display request not including the cookie, the second content being configured to prompt the user to link the second account in the second web service, wherein the first web service is different from the second web service.

* * * * *